Nov. 8, 1938.                    D. SCIAKY                    2,136,059
                   MACHINE FOR THE ELECTRIC WELDING OF TUBES
                Original Filed May 29, 1936         3 Sheets-Sheet 1
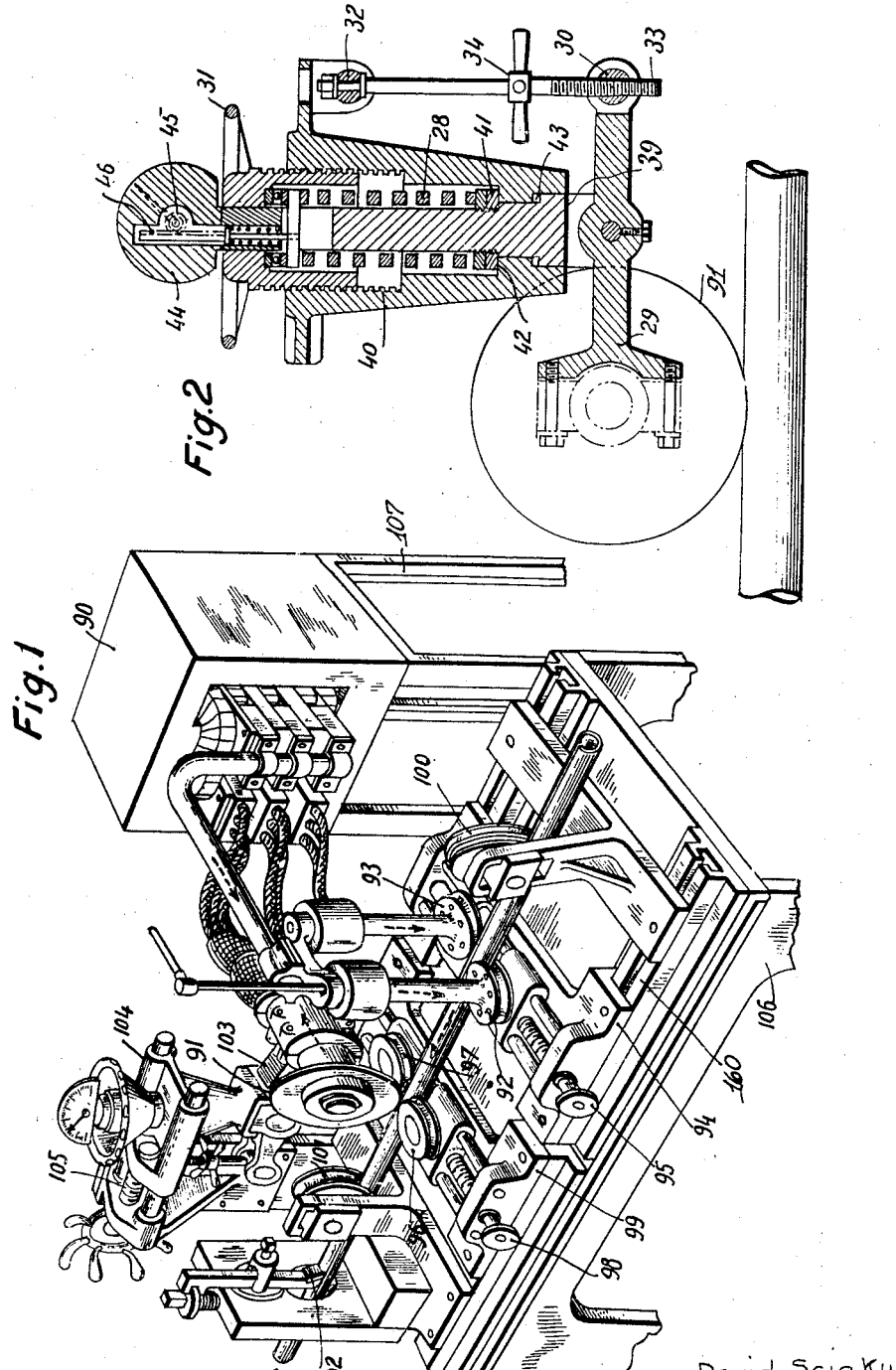
David Sciaky
INVENTOR

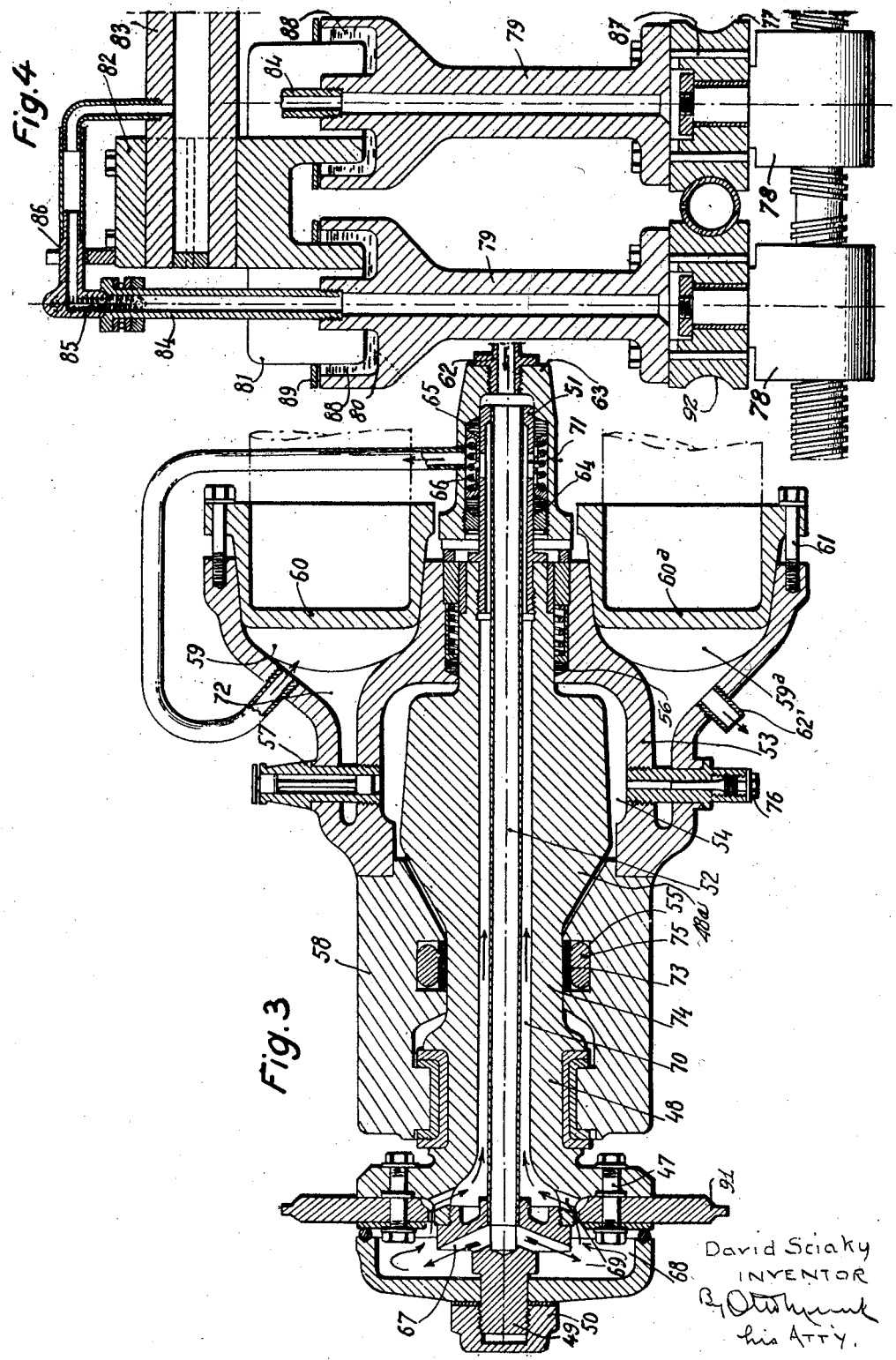

Nov. 8, 1938.                D. SCIAKY                2,136,059
            MACHINE FOR THE ELECTRIC WELDING OF TUBES
              Original Filed May 29, 1936    3 Sheets-Sheet 3
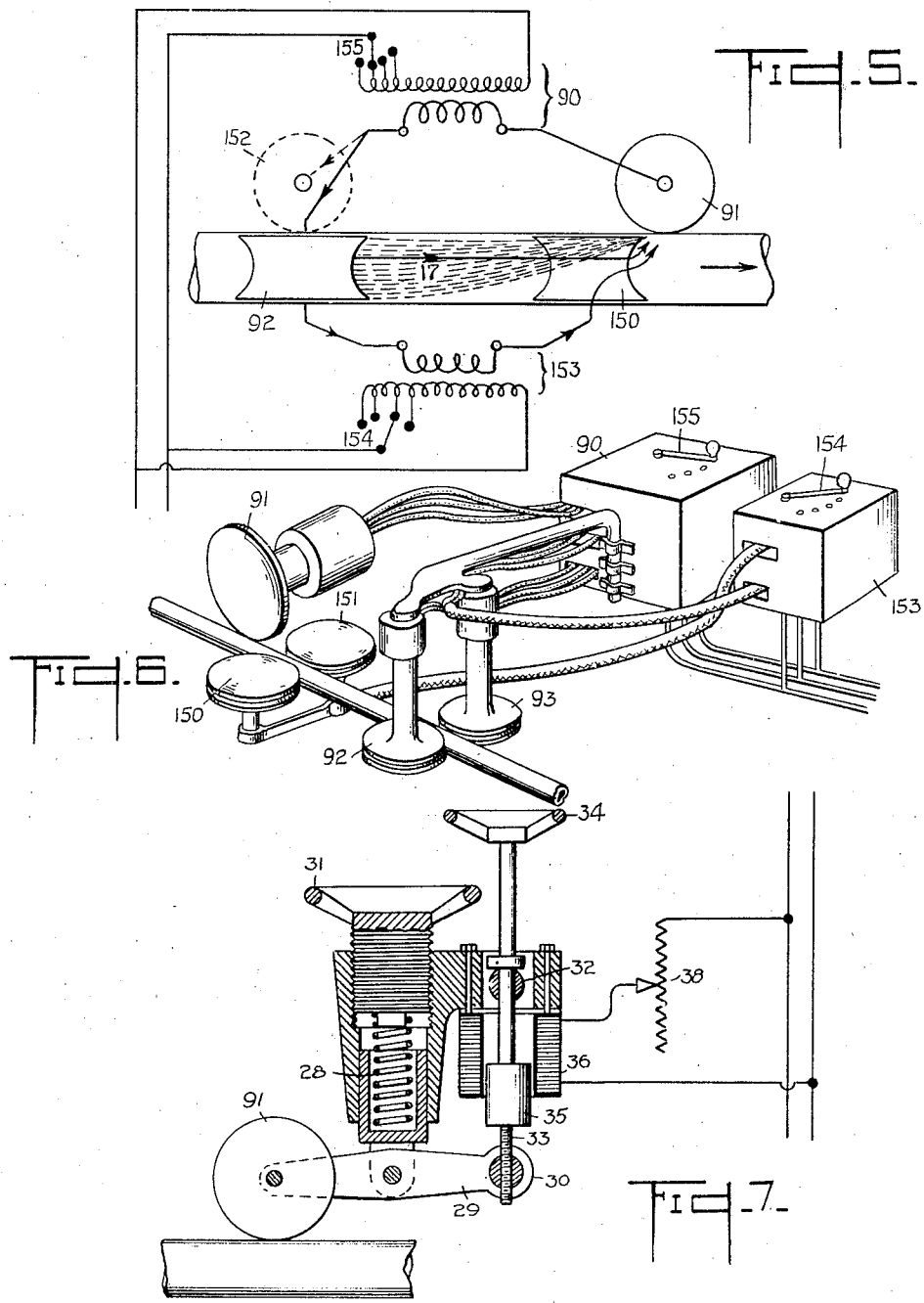
David Sciaky
INVENTOR
BY
      ATTORNEY.

Patented Nov. 8, 1938

2,136,059

UNITED STATES PATENT OFFICE 2,136,059

MACHINE FOR THE ELECTRIC WELDING OF TUBES

David Sciaky, Paris, France

Original application May 29, 1936, Serial No. 82,485. Divided and this application December 2, 1936, Serial No. 113,779. In France May 29, 1935

5 Claims. (Cl. 219—6)

This application is a divisional application of applicant's copending application Serial No. 82,485, filed May 29, 1936.

One object of the present invention is to provide an improved machine for the resistance welding of tubes in which use is made of roller electrodes contacting with the work to be welded, which is continuously moved forward.

More specifically, the object is to ensure the direct and also the indirect welding in one single operation.

A further object of the invention is to reduce to a minimum the expenditure of current used for the weld, and also to increase the speed at which the work is displaced during its passage over the welding electrodes, thus raising the output of the machine.

Another purpose is to exercise adequate control over the welding effected by the electrodes and so increase the quality of the weld.

The invention likewise aims at causing the metal to anneal during the welding operation itself and at the suppression of internal stresses. In view of this, the invention renders the operations with an annealing furnace superfluous and reduces to a minimum the necessity for normalizing, thus lowering the price of the finished product.

Furthermore, the invention aims at the production of finished products having a smooth, polished appearance of a bluish colour owing to the avoidance of any coating of black iron oxide which is formed at 300° to 600°. The tube is therefore in the optimum condition to take on a highly adhesive layer of zinc.

Finally the invention aims at providing a welding machine of great simplicity and of the utmost efficiency.

The machines whereby the foregoing objects are realized have the features set forth in the following description and in the claims at the end of the said description.

The preferred constructional form of the invention is illustrated, by way of example, in the accompanying drawings, wherein:—

Fig. 1 reproduces a perspective view of the complete machine.

Fig. 2 is a vertical sectional view of the support of the welding roller.

Figs. 3 and 4 are sectional views through the center lines of the roller electrodes.

Fig. 5 is a diagram of a variation.

Fig. 6 is a partial perspective view of the variation shown diagrammatically in Fig. 5.

Fig. 7 is an elevation of a part of the welding machine showing a modification of the support for the welding roller.

In Fig. 1, the path followed by the current is shown by arrows.

The transformer 90 supplies on the one hand the upper roller 91 and on the other hand the two side rollers 92, 93.

The current input is carried out by two rollers 92 and 93 mounted in parallel, while the current output is carried out through a single roller 91 arranged on the gap of the tube to be welded. The flow of the current is obtained according to the process described in the application Serial Number 82,485.

The two rollers 92 and 93 are mounted on a carriage 94, which can be adjusted in a direction parallel to that of the tube displacement. The gripping of the tube between the roller 92 and the roller 93 is effected by means of the screw 95.

At the level of the electrode 91 are fitted two pressure rollers 96 and 97, which enable the two sides of the wall of the tube to come closely together in the neighbourhood of the point where the weld is to be carried out.

These two rollers can be adjusted by means of the screw 98. The whole unit comprising these two rollers is also mounted on a carriage 99, the position of which can be adjusted. The tube blank, which has been suitably prepared, passes under a guide roller 100 before passing between the two current-feed rollers 92 and 93. Immediately after the weld has been completed, the tube is guided by an adjustable roller 101, which can be set in all directions, and a scraping tool 102 completes the operation by removing any excessive burrs.

The pressure of the electrode 91 is effected by a lever system 103, the whole of which is suspended on a carriage 104.

The position of the carriage 104 which supports the electrode 91 may be made parallel to the tube by means of the screw 105.

All the operative members can be regulated independently of one another and the distance separating the two "up-stream" rollers 92, 93 from the "downstream" roller 91 may be varied at will. Similarly, the lateral rollers may have their pressure modified, while the position of the pressure rollers relatively to the welding roller can also be altered.

The tube blank may be disengaged from the machine with great ease.

The whole unit is mounted on a frame 106, which is integral with the chassis 107, which supports the transformers.

For the sake of greater clearness, the diagram showing the circulation of the water that cools the different elements of the machine is not given; also the control switch which enables the welding current to be regulated has also been omitted.

In Fig. 2, there is represented separately and in its practical constructional form, the mechanical pressure device 91. The lever 29 is guided by the rod 39 which slides in the support 40. A nut 41, screwed on rod 39, allows of limitation of the travel of the rod and, consequently, of the roller 91 also, by the nut 41 bearing on the bottom of the hole 42. In this way the roller 91 is prevented from dropping into the gap in the tube whenever, for any reason, the heated metal should give way and open under the pressure of the roller 91. The amount of play indicated at 43 determines the total upward travel of the roller 91 against the pressure of the spring 28. The hand-wheel 34 permits, in turn, of lifting the roller from the tube blank by rotation of the screw 33, the upper extremity of which bears on the rotating stop 32. The wheel 31 enables the pressure of the spring 28 to be regulated. In order that the degree of pressure of the latter may be apparent, there is provided a dial 44 over which moves a pointer integral with a pinion 45 engaging with a rack 46, whose vertical displacement corresponds to that of the hand-wheel 31 as it is screwed up or down, and in consequence, the linear value of the compression of the spring 28 is indicated. It is seen that it is possible to raise the roller 91 instantly from the work by turning the handles 34 without the pressure determined by the hand-wheel 31 being affected.

Fig. 3 shows in detail the welding roller or disc 91, the guiding-means and the arrangement for supplying current to this roller and for the circulation of water round the electrode.

The disc 91 is secured on a hollow spindle 48 by means of bolts and nuts 47. This hollow spindle also carries, at the same end, the cup-shaped member 68 which is secured on the boss 49 by means of a cap 50 screwed on to the boss which has its end screw-threaded. The spindle 48 also has an internal tube 52, which is secured to the ring 51 screwed into the opposite end of the hollow spindle 48. The spindle 48 has an enlarged portion 48a and is surrounded by a stationary drum 53 within which it can rotate. A space or chamber 54 is formed between the enlarged portion of the shaft and the inside of the drum 53.

This chamber 54 is made leakage-proof by joints 55 and 56 which are constructed and arranged so as not to oppose the rotation of the hollow spindle 48. The drum 53 is kept filled with mercury which is inserted through plug 57, while another plug 76 enables the mercury to be drained out when necessary.

The joint between the spindle and its support consists of a band of plaited asbestos 73, wound in one or several layers around a cylindrical part 74 of the spindle 48. On this band is fitted a ring of flexible rubber 75, which in virtue of its extensibility, may be slipped over the enlargement 48a. When the bearing 58, which is in two halves, is put in place, this ring 57 is compressed in its position. This joint ensures a perfect tightness as the rubber exerts an even and constant pressure on the asbestos, prevents the mercury from being pressed over the sides, and at the same time allows of the spindle sliding very smoothly.

The drum 53 is formed, on the outside, with two tapering recesses 59 and 59a, within which are mounted the thimbles 60 and 60a of the current supply leads, the thimbles being secured in place by studs 61. Within these thimbles are welded the extremities of the conductors coming from the secondary of the welding transformer.

The current flows through these thimbles and then through the member 53 and the mercury bath contained in the chamber 54 and thence to the spindle of the welding electrode and to the latter itself. In this way contacts as satisfactory as possible are maintained, there is no leakage from the mercury enclosure and there is a minimum friction on the spindle of the electrode.

The water for cooling the electrode is supplied through a nozzle 62, which is screwed into the stationary part 63, the tightness between the rotating and the stationary parts being maintained by the joints 64 and 65 which are subject to the action of a spring 66.

The water passes into the interior of the tube 52, then into the channels 67 cut in the plug 49 and circulates within the chamber 68, this cooling the electrode 91. The water is then discharged through the channels 69 and the space 70 formed between the inside of the member 48 and the outer wall of tube 52, so as to pass through the aperture 71 cut in the ring 51, and, by a pipe connection, into the chamber 72 so as to cool the ends of the thimbles 60 and also the partition 53 surrounding the mercury bath. The water is finally discharged through a side pipe 62'.

The member 48, 48a is made of an alloy of copper.

In order to prevent the mercury from acting on the parts with which it comes in contact and causing leakages, the surfaces in contact with the mercury are covered by a metal immune from attack by the latter, such, as, for instance, an electrolytic layer of chromium.

In Fig. 4 are shown the two "up-stream" rollers with the arrangement for the supply of current and of cooling water. The two rollers 92, 93 are carried by two supports 78.

Each spindle 79 is secured to a roller by bolts. At its upper extremity it is formed as a cup 80, filled with mercury. This spindle and its cup thus participate in the rotation of the roller. A conducting member 81 dips, by its two curved extremities into the two cups of the two spindles 79. The member 81 is provided, at its upper end, with a semi-cylindrical surface on which is secured by the cover 82 and its fixing bolts, a cylindrical, current-conducting rod 83 which connects the member 81 with the pole of the transformer opposite to that of the welding roller (Fig. 3).

Each of the spindles 79 is hollow and receives cooling water by way of a pipe 84 screwed into its upper end and on the end of pipe 84 there bears under the influence of a spring 85, a stationary nozzle 86 for the supply of water. Apertures 87, cut in the rollers 92, 93, allow of the cooling water flowing out. The rod 83 is itself hollow and is also cooled by water circulation. The same arrangements as for the members 53 and 48a in Fig. 3 are taken to protect their surfaces from the action of mercury. The play allowed for at 88 enables the two rollers (and their integral member) to shift their positions relatively to each other without the stationary member 81 being affected. The cover 89 protects the mercury from outside influence.

Figs. 5 and 6 illustrate an improved modification of a device according to the present invention, which modification comprises a pair of side pressure rollers 150 having a certain difference of potential relatively to the welding roller 91.

As in the case of Fig. 1, there are here also the two "upstream" side rollers 92, 93, the main welding transformer 90 and the single roller electrode arranged "downstream", at the welding point. An additional roller 152 electrically connected with roller 92 may be provided, as shown in dotted lines.

The pressure rollers 150 are connected to one terminal of the secondary winding of an auxiliary transformer 153 comprising a tapping switch 154. The opposite terminal of the transformer 153 is connected to the "upstream" rollers 92, 93.

When the switch 154 is adjusted to a dead stud, no current flows through the secondary winding of the auxiliary transformer 153, and the entire feed current flows through the main transformer 90 into the work between the rollers 92, 93 and roller 91.

If, on the other hand, the switch 154 of the auxiliary transformer 153 is so adjusted as to cause a current to flow in the direction indicated by the arrows in Fig. 5 and to regulate the intensity of this current, the intensity of the current passing through the tube between the rollers 92, 93 and the roller 91 is reduced, and at the same time that of the current passing between the rollers 150 and 91 is increased. The result is a less intense heating of the tube section between the rollers 92, 93 and the roller 91 and, on the other hand, a more intense heating at the exact spot where the welding is to be effected.

Assuming that the output of the transformer 90 can be regulated by means of the tap switch 155, there is thus provided a regulating means which is independent of the heating of the entire tube as well, as of the heating of the gap at the exact spot where the weld is to be effected.

The device illustrated in Fig. 7 is intended to regulate the contacting pressure of the "downstream" or welding roller 91 on the tube, in accordance with variations in the current supply of the machine. The current supply system of the roller 91 is omitted in Fig. 7 in order to simplify the drawing.

The welding roller 91 is pressed onto the tube by means of a spring 28 which acts upon a lever 29 pivoted at 30. A hand wheel 31 serves to regulate the pressure of the spring 28, the reaction of the latter being taken up partly by the tube at the spot where it is contacted by roller 91 (welding pressure) and partly by the abutment 32 in engagement with a collar on the threaded rod 33, which rod is adjustable by means of a hand wheel 34. On the rod 33 is fitted an iron core 35 subject to the magnetic action of a coil 36 supported on the frame of the machine and connected to the current supply 37 through an adjustable rheostat 38.

The attraction of the iron core 35 by the coil 36 lifts the collar on the rod off the stop 32 and causes a further compression of the spring 28 whereby the contacting pressure of roller 91 is accordingly increased. The effectiveness of the coil 36 can be regulated by means of the rheostat 38.

This arrangement operates as follows:

If the voltage of the supply falls, the attraction on the iron core 35 will be diminished and the pressure of the roller 91 on the tube will be accordingly reduced with the result that the contact resistance r between the roller 91 and the tube is increased. Simultaneously the intensity I of the welding current is diminished.

Obviously the coil may be connected to the primary or secondary winding of the transformer 90 of Fig. 1, so that the current will act directly and automatically to compensate for variations in the temperature of the weld.

The automatic variation of the pressure of the welding rollers, in dependence on the welding current or the tension of the supply voltage may, of course, be effected by means other than those indicated, by way of example, in Fig. 7, without exceeding the scope of the present invention, the novelty of which resides in the automatic regulation of the temperature of the precise spot where the weld is to be effected, by the direct or indirect, partial or total action of the current on the contacting pressure of the welding roller.

What I claim as my invention and desire to secure by Letters Patent is:—

1. In a machine for the electric resistance welding of tubes; means for displacing the work with a continuous translation movement; a main welding transformer having a primary winding and a secondary winding for welding; roller electrodes for the supply of the current arranged on the upstream side of the work, connected with one of the ends of the secondary winding of the main transformer; and a roller electrode arranged on the downstream side over the gap in the work and connected to the other end of the secondary winding of the main transformer.

2. In a machine for the electric resistance welding of tubes; means for displacing the work with a continuous translation movement; a main welding transformer having a primary winding and a secondary winding for welding; an auxiliary transformer having a primary winding and a secondary winding; roller electrodes for the supply of the current arranged on the upstream side of the work to be welded and connected with one of the ends of the secondary winding of the main transformer as well as with one of the ends of the secondary winding of the auxiliary transformer; a roller electrode disposed on the downstream side over the gap in the work and connected to the other end of the secondary winding of the main transformer; and an additional roller electrode, for regulating and distributing heat, applied on the work and connected with the other end of the secondary winding of the auxiliary transformer.

3. In a machine for the electric resistance welding of tubes: means for displacing the work with a continuous translation movement; a main welding transformer having a primary winding and a secondary winding for welding; roller electrodes for the supply of current arranged on the upstream side of the work to be welded and connected to one of the ends of the secondary winding of the main transformer; a roller electrode arranged on the downstream side over the gap in the work and connected to the other end of the secondary winding of the main transformer; a main tapping switch controlling the current feeding the primary winding of the main transformer; and means to regulate the distance between the upstream roller electrodes and the downstream welding roller.

4. In a machine for the electric resistance welding of tubes: means for displacing the work with a continuous translation movement; a main transformer having a primary winding and a secondary winding for welding; an auxiliary transformer having a primary winding and a secondary winding; roller electrodes for the supply of the current arranged on the upstream side of the work to be welded and connected with one of the ends of the secondary winding of the main transformer, as well as with one of the ends of the secondary winding of the auxiliary transformer; a roller electrode arranged on the downstream side over the gap in the work and connected with the other end of the secondary winding of the main transformer; an additional roller electrode for regulating and distributing heat, connected to the other end of the secondary winding of the auxiliary transformer; an auxiliary tapping switch controlling the current feeding the primary winding of the auxiliary transformer; and means to regulate the distance between the upstream roller electrodes and the downstream welding roller.

5. In a machine for the electric resistance welding of tubes, means for displacing the work with a continuous translation movement, a source of electric current, roller electrodes for the supply of the current arranged on the upstream side of the work piece and connected with one terminal of said source of current, and a roller electrode arranged on the downstream side over the gap in the work piece and connected to the other terminal of said source of current.

DAVID SCIAKY.